US008005803B2

(12) United States Patent
Graefe et al.

(10) Patent No.: US 8,005,803 B2
(45) Date of Patent: Aug. 23, 2011

(54) BEST PRACTICES ANALYZER

(75) Inventors: Goetz Graefe, Bellevue, WA (US); Christian Kleinerman, Bellevue, WA (US); Amrish Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/181,279

(22) Filed: Jul. 14, 2005

(65) Prior Publication Data

US 2007/0016544 A1   Jan. 18, 2007

(51) Int. Cl.
*G06F 7/00* (2006.01)

(52) U.S. Cl. .......................... 707/694; 707/702; 717/173

(58) Field of Classification Search .................. 726/24, 726/23; 713/187, 201; 709/224
See application file for complete search history.

(56) References Cited

U.S. PATENT DOCUMENTS

| | | | | |
|---|---|---|---|---|
| 6,654,751 | B1* | 11/2003 | Schmugar et al. | 707/10 |
| 6,804,627 | B1* | 10/2004 | Marokhovsky et al. | 702/182 |
| 2002/0077882 | A1* | 6/2002 | Nishikawa et al. | 705/10 |
| 2002/0087587 | A1* | 7/2002 | Vos et al. | 707/203 |
| 2003/0093682 | A1* | 5/2003 | Carmona et al. | 713/187 |
| 2003/0115212 | A1* | 6/2003 | Hornibrook et al. | 707/103 R |
| 2003/0115511 | A1* | 6/2003 | Kubota | 714/47 |
| 2005/0044418 | A1* | 2/2005 | Miliefsky | 713/201 |
| 2005/0055673 | A1* | 3/2005 | Dias et al. | 717/127 |
| 2005/0216490 | A1* | 9/2005 | Dias et al. | 707/100 |
| 2005/0283603 | A1* | 12/2005 | Raman et al. | 713/152 |
| 2005/0289115 | A1* | 12/2005 | Garden et al. | 707/2 |
| 2006/0085852 | A1* | 4/2006 | Sima | 726/22 |
| 2007/0150957 | A1* | 6/2007 | Hartrell et al. | 726/24 |

OTHER PUBLICATIONS

Jon Avner, "Introducing the Microsoft Exchange Best Practices Analyzer Tool", Microsoft Exchange Team Blog, Sep. 21, 2004, http://msexchangeteam.com/archive/2004/09/21/232516.aspx.*

Mark Wehmhoefer, SQL Server 2000 Best Practices Analyzer Tool 1.0 by Microsoft, Sep. 10, 2004, http://www.sqlserverdirectory.com/sqlserver_product_reviews_Best_Practices_Analyzer_Tool.htm.*

Microsoft, Best Practice Analyzer Tool for Microsoft SQL Server 2000 rule reference and user guide 1.0, May 24, 2004.*

* cited by examiner

*Primary Examiner* — Vei-Chung Liang
(74) *Attorney, Agent, or Firm* — Woodcock Washburn LLP (57) ABSTRACT

The Best Practices Analyzer scans one or more instances of the database server for conformance to a set of guidelines and recommendations ("best practices" or "best practice rules"). Best practice rules may be defined by the user and/or may be provided. The Best Practices Analyzer performs analysis of usage of database programming (query) language and conformance to guidelines. Best Practices Analyzer may check for correct execution of common administrative tasks. Rules may be implemented as procedural code in any language.

14 Claims, 3 Drawing Sheets

BEST PRACTICES ANALYZER

BACKGROUND

Enterprise servers including relational database servers provide a wealth of capabilities and functions and are correspondingly complex to manage and operate. Managing the servers typically is the task of the administrator, who must consume and assimilate massive quantities of guidance documentation to be even reasonably confident that his/her servers are well-managed. Developers who write applications for the servers must be similarly well-educated.

One of the challenges associated with this self-education process is the sheer mass of information to be considered. For example, vendors publish thousands of pages of documentation designed for administrators and developers, but few administrators and developers have the time to read, much less absorb and remember all that information. Another challenge to be overcome is that the guidance documentation (e.g., "best practice" recommendations) is not consolidated into a single source and may not even be reasonably accessible. Guidance may be provided in vendor documentation or in white papers, but may also be rather inaccessibly stored in the heads of consultants or developers in the development group of software vendors. For example, many times best practice recommendations derive from an understanding of the assumptions under which the product was developed. These assumptions are often known only by the vendor development team. Even supposing a consolidated list of recommendations were available, it is a non-trivial task to verify that a particular installation complies with best practices and to configure the installation to comply with the recommendation.

To make matters worse, the state of the art (what constitutes best practice), evolves. Old knowledge becomes stale, due in part to advances in hardware design, so that best practices recommendations must be updated from time to time, and the servers should be re-evaluated for compliance whenever the best practice recommendations change. Furthermore, different installations or operating environments may want to restrict or customize best practice recommendations. Currently, there is no easy way to do this.

A tangential problem is associated with deprecation, the process by which a feature is gradually phased out of a product. Typically, a vendor who intends to phase out a feature will send messages indicating this intention to users and will suggest a migration alternative or alternatives. Traditionally, it has been hazardous for vendor product teams to deprecate features because even when the message is successfully communicated and migration alternatives are provided, it is difficult for users to assess the impact of the deprecation of a feature and therefore are unprepared when the feature goes away. On the part of the vendor, decisions may be made to deprecate a feature with little awareness of how widespread is the use of the feature. It would be helpful for the software vendor to know the extent of usage of the feature being considered for deprecation. Similarly, it would be helpful for the user to know where the feature being deprecated is used and how widespread is the use and to have advance warning of upgrade problems.

While tools are available that provide recommended database designs (e.g., AllFusion® ERwin Data Modeler) or monitor "the health" of database servers (e.g., SQL Health), no known tools address all the problems noted above. Furthermore, tools provided by third party vendors are not likely to have access to the exact code used in the product on which the tool operates so that the processing that occurs in the tool will not exactly mimic the processing of the product. Similarly, third party vendors are not likely to be able to anticipate or deduce changes based on implementations choices made by the database software vendor.

SUMMARY

The Best Practices Analyzer scans one or more instances of the database server for conformance to a set of guidelines and recommendations ("best practices" or "best practice rules"). Best practice rules may be defined by the user and/or may be provided. The Best Practices Analyzer performs analysis of usage of database programming (query) language and conformance to guidelines. Best Practices Analyzer may check for correct execution of common administrative tasks. Rules may be implemented as code (procedurally). Rules may be parameterized. The user may set the parameters, providing another level of customization. Best practice rules may be automatically updated when new or updated rules are detected. Scan configurations may associate particular database server instances with particular sets of best practice rules and parameters. Results of scans may be automatically reported back to a supplier of the database software.

DETAILED DESCRIPTION

Overview

The Best Practices Analyzer scans one or more instances of a database server for conformance to a set of guidelines and recommendations (i.e., "best practices" or "best practice rules"). The recommendations may be directed to several main audiences including database application developers and database administrators. For developers, the Best Practices Analyzer performs analysis of the database programming language (e.g., TSQL for SQL Server, PL/SQL for Oracle databases, ANSI SQL (PSM) for DB2 databases and so on) and for conformance to guidelines on the relational database design. For example, the Best Practices Analyzer can verify that updatability information is specified for cursor declarations, verify use of schema qualifications for tables and view, check whether all tables in a given database contain a primary key or a unique index and so on, thereby simplifying development of database application and helping to avoid common oversights.

For database administrators, Best Practices Analyzer may check for correct execution of common administrative tasks, (like database backups, for example), or may check whether these tasks are being performed at all. It can check logs, (e.g., WINDOWS logs, SQL error logs, etc.), registry and many other sources for improper configuration settings, unexpected failures, or suggest changes to be made to improve the performance of a database server instance.

The Best Practices Analyzer can perform any number of checks. Over time, as new recommendations are developed, and as new releases of database server software are made available, the body of recommendations can be modified and added to. The Best Practices Analyzer provides an automated way of flowing knowledge and guidance from vendor development teams and others to align actual and intended usage of the product, thereby optimally reducing support calls and improving the competency of users of the product.

The Best Practices Analyzer may include checks that enable users to identify usage of deprecated features. The Best Practices Analyzer may include a list of features that are to be deprecated in a future release and flag usage of any feature on the list. The Best Practices Analyzer may also explain to customers the need to remove usage of the feature and provide information on feature replacement or migration alternative(s). The Best Practices Analyzer may also provide information concerning backwards incompatible behaviors. The Best Practices Analyzer may also provide upgrade readiness checks. Periodic updates can include checks that enable customers to prepare for upcoming changes. For example, the Best Practices Analyzer may enable users to identify areas in which their current applications may encounter breaking changes in the next release of the database product. By shipping the Best Practices Analyzer out of band (at a different time) than the database product, forewarning of changes to come may be provided to the user. The Best Practices Analyzer may also report results of scans or usage of one or more particular features of the database system detected by a scan, back to a supplier of the database software. This feature may be useful to a vendor to determine how widespread is the use of a feature and/or may help a vendor to determine how easily a feature can be deprecated Exemplary Computing Environment FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (APT), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

Figure 1:
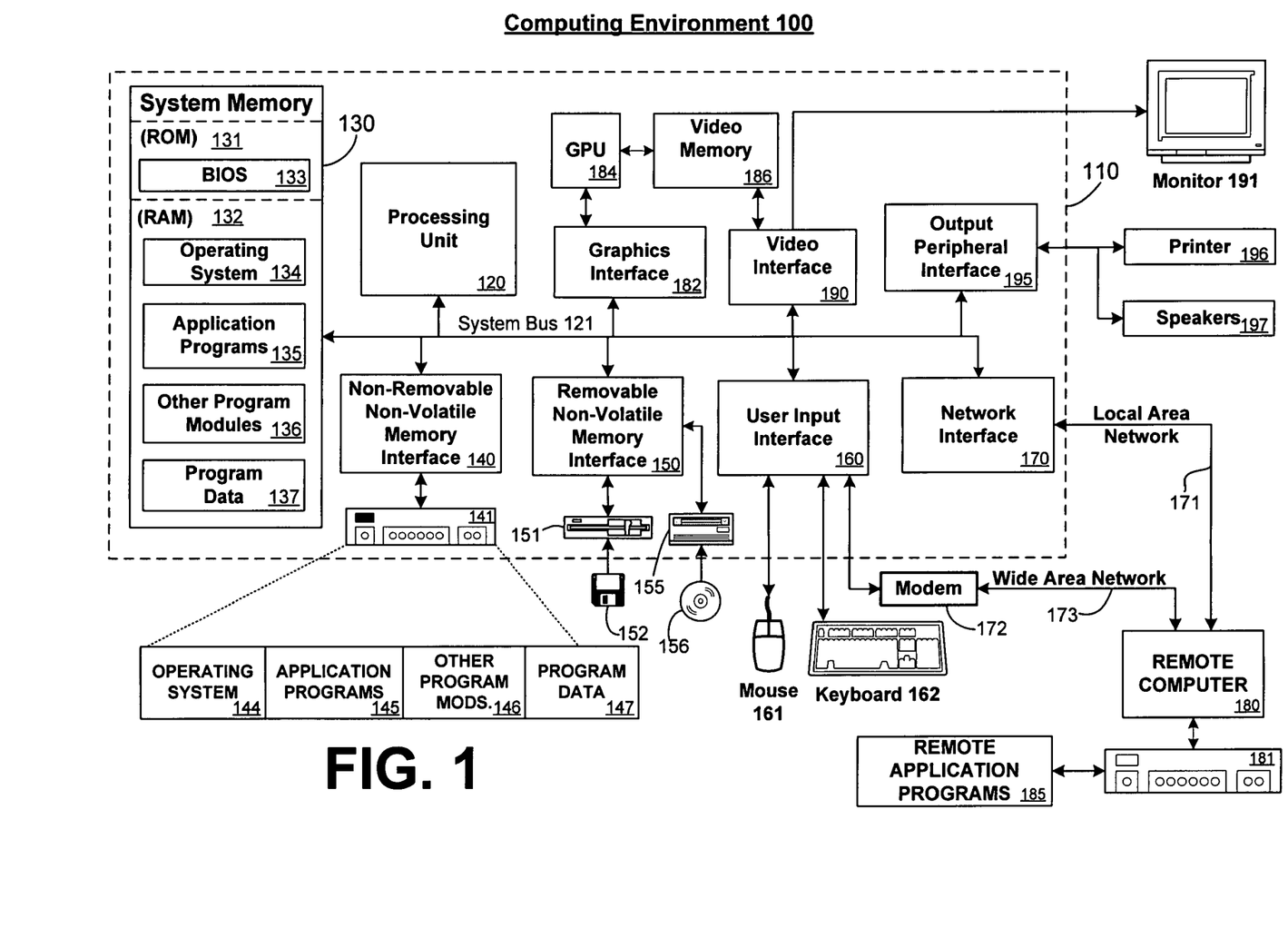
FIG. 1 is a block diagram showing an exemplary computing environment in which aspects of the invention may be implemented.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Best Practices Analyzer

Figure 2:
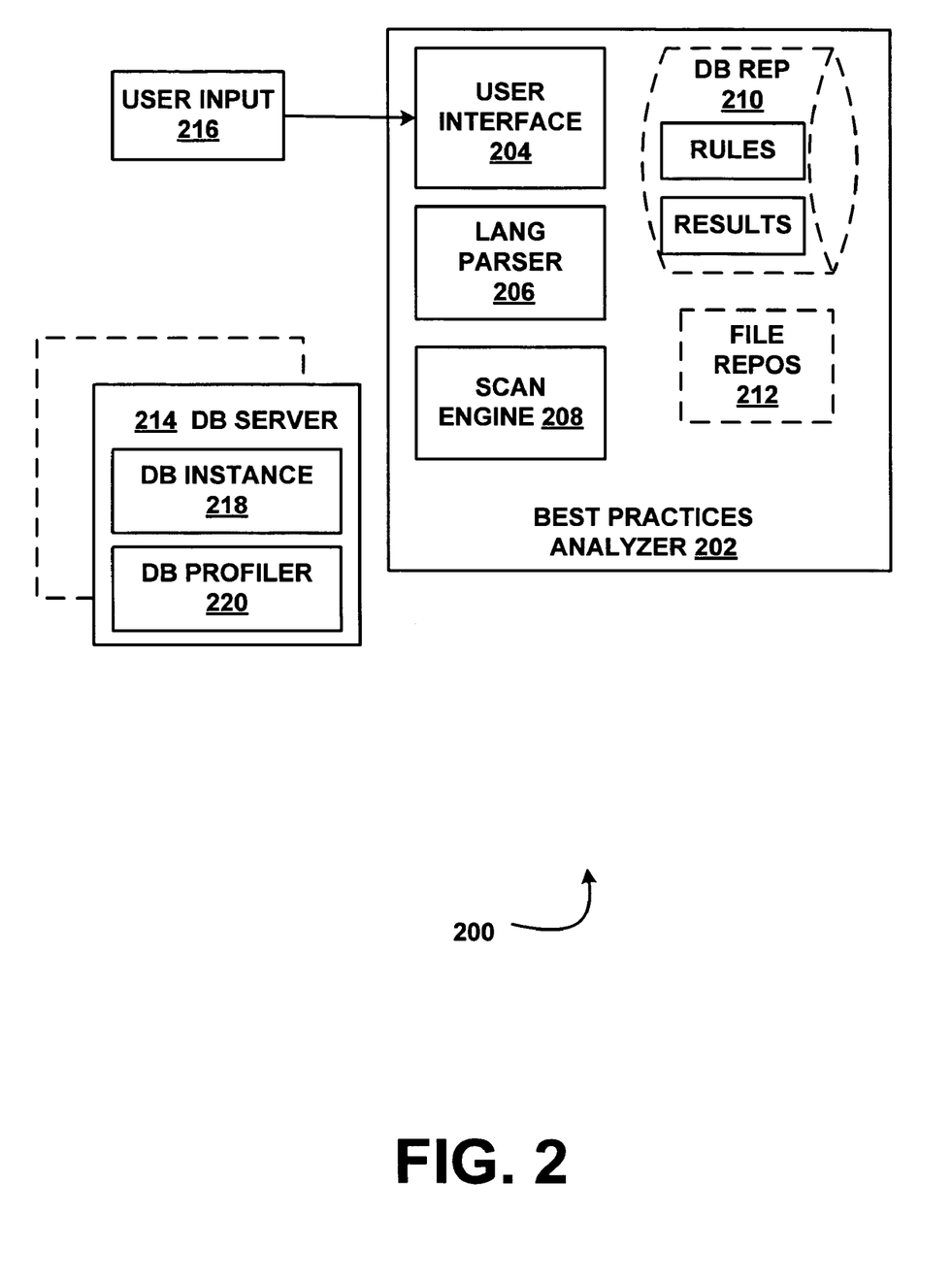
FIG. 2 is a block diagram showing an exemplary system for analyzing a database server instance for conformance with best practice guidelines.

FIG. 2 is a block diagram of an exemplary system for best practices analysis in accordance with some embodiments of the invention. System 200 may reside in whole or in part on one or more computers, each of which may be a computer such as computer 110 described above with respect to FIG. 1.

System 200 may include one or more of the following components: a best practices analyzer 202 and one or more instances of a database server 214, etc. to be analyzed for conformance with a body of recommendations or best practices. The Best Practices Analyzer 202 may be implemented using Microsoft Common Language Runtime (CLR), other programming languages and/or HTML. The architecture enables extensibility of the checks to be performed, extensibility of the data repository and extensibility of the user interfaces that drive the scan engine 208. The Best Practices Analyzer 202 may include one or more of: a user interface 204, a database language parser 206, a scan engine 208, a database repository 210 and/or file repository 212. The Best Practices Analyzer 202 may scan one or more instances of a database server such as database server 214 according to options entered (user input 216) to the user interface 204. The Best Practices Analyzer 202 may be invoked via a command line executable, a user interface or by other suitable means. The database server instance or instances scanned may reside on the same or on separate servers.

The Best Practices Analyzer 202 in some embodiments of the invention is a tool that scans one or more instances of a database server for conformance to a set of guidelines and recommendations, referred to herein as best practices or best practice rules. The recommendations may be directed to one or more audiences including database application developers and database administrators. For developers, the Best Practices Analyzer 202 may perform analysis of the database programming language (e.g., TSQL for SQL Server). For database administrators, the Best Practices Analyzer 202 may check for correct execution of common administrative tasks, (like database backups, for example), or may determine whether these tasks are being performed at all. It can check logs, (e.g., WINDOWS logs, SQL error logs, etc.), registry and many other sources for improper configuration settings, unexpected failures, or it may suggest changes to be made to improve the performance of a database server instance. When a failure to comply with a best practice rule is found, information is stored in a best practices repository (repository 210 and/or repository 212). This information can be used to generate informational reports.

One or more user interfaces, as represented in FIG. 2 by user interface 204 may be provided. The user interface 204 in some embodiments of the invention receives user input 216 enabling a customer or user to invoke the best practices analyzer scan engine 208, to specify the database server(s), (represented in FIG. 2 by database server 214, etc.), the database instance or instances (represented in FIG. 2 by database instance 218, etc.), to scan, to specify which rules (represented in FIG. 2 by rules in database repository 210 or file repository 212 (rules not shown)), with which compliance or non-compliance is determined and to enable the customer or user to browse through reports on results of scan operations (represented in FIG. 2 by results in database repository 210 or file repository 212 (results not shown)). In some embodiments of the invention, the user interface 204 is a graphical user interface. In some embodiments of the invention, the user interface may be implemented in HTML. A command line user interface may also or alternatively be provided to enable customers to programmatically perform scans as well as to schedule periodic runs of the best practices analyzer scan engine 208. In some embodiments a clean division between user interface 204 and scan engine 208 enables multiple user interfaces to interact with the scan engine 208. For example, in addition to the HTML user interface and the command line interface described above, user interfaces which integrate with product management or monitoring tools (provided by, for example, third party vendors such as Quest), Visual Studio, Microsoft Operation Manager (MOM), Microsoft Baseline Security Analyzer (MBSA), and so on, any or all of which may interact with the scan engine 208.

The database language parser 206 may scan stored procedures and functions on the database server and may parse the database programming language statements (e.g., TSQL statements, PL/SQL statements, ANSI SQL (PSM) statements, etc.) found therein for compliance with the specified rules. The database language parser 206 may also scan batches of database query language constructed and submitted from within applications. In some embodiments of the invention, database profiler trace files are scanned. A database profiler may capture all requests (including but not limited to single queries, batches of queries, stored procedures, invocations and so on) received by the database server. Once captured and saved to a file, the database language parser 206 may extract queries and perform the syntax analysis specified by the appropriate rule(s). In some embodiments of the invention, the database language parser 206 is the same parser used by the database server product to ensure correctness of the scan and complete grammatical accuracy. Alternatively, the database language parser 206 may perform the same processing as the database server product parser, all the processing that the database server product parser performs and more or some subset of the processing that the database server product parser performs.

The best practice analyzer scan engine 208 may provide one or more of the following services: the scan engine 208 may provide entry points for the user interfaces to maintain a list of database servers (e.g., SQL Server instances), create bindings between database server instances and rules (collectively referred to as a "best practice group" and may enable scan operations to be started, cancelled, and reported upon. The scan engine 208 may also interface with the best practices analyzer repository to load and store information associated with database server instances to scan, keep track of the list of rules available for scanning and store reports on results of scan executions. The scan engine 208 may also provide general scheduling and progress reporting mechanisms to drive a scan request. The scan engine 208 may also check online for new and updated best practice rules, and if found, automatically or based on user response, download the new/updated rules. In some embodiments the scan engine 208 checks online for new and updated rules before each scan, or alternatively, at a specified time interval. Given a list of best practice rules to run, the scan engine 208 may create threads, queue up requests, report process and store status of the execution in the repository. The scan engine 208 may also provide general exception handling and a reliability framework. The scan engine 208 may also provide isolation to each rule running and ensure that fatal errors do not affect the execution of the overall scan engine 208. The Best Practices Analyzer scan engine 208 may be implemented using Microsoft Common Language Runtime (CLR). The scan engine 208 may take advantage of Code Access Security features in CLR to verify and enforce code signing and publisher identities. The core scan engine 208 may verify that the rules are signed, enabling tight control over which code can be run. A different security context may be enabled for unsigned rules (e.g. user-defined rules).

A best practices repository such as repository 210 and/or 212 may be created. In some embodiments the repository is created as part of the installation process. The repository may store information needed by the Best Practices Analyzer 202 to perform its analysis. The repository may also store the results of scanning operations performed by the Best Practices Analyzer 202. The repository may also store a list of available rules. In some embodiments of the invention, the list of rules may comprise a list of pointers to executables or dlls. The type of repository created may be user-specified. By default, a database-driven (e.g., a SQL Server database) repository may be created. Alternatively, a custom repository, such as but not limited to an XML file or files, may be specified and created. Possible advantages of enabling a custom repository to be created are removal of dependency on a database and easy integration with other tools and source code control systems. Possible advantages of creation of a database repository are scalability and ease of access by query.

Within the repository may be stored best practice rules, results of scans, a list of database servers to be scanned, parameters for rules and one or more entry points for dlls or functions. Best practice rules may be provided by the software vendor and may represent inside knowledge based on the way the software vendor implemented the database server product. The rules may be associated with additional input received from the user. The additional input associated with a rule is referred to as rule parameters. As an example, the rule that checks for existence of database backups may allow the user to specify how many days back to check for back ups. A default value may be provided that may be overridden by the end user.

In some embodiments of the invention, there are no restrictions on what a rule may or may not do. In some embodiments no software is required to reside on the server side in order to run the scan. That is, all the operations required by the scan may be remotable operations (ones accessing the registry, the file system or the database product itself, implying that there is no need for additional software to be installed on the database server instance target for the scan operation).

Rules may be implemented using Microsoft Common Language Runtime (CLR). In some embodiments rules are built with an architecture that enables extensibility of both the checks to be performed and the data repository in which the rules are stored. Rules may be updated from the network whenever new or updated rules are available, thereby reducing turn around time from the time the development team identifies a recommendation, feature deprecation or upgrade breaking change to the time the user or customer is able to take advantage of this information.

In some embodiments a published interface (IBestPractice) is defined to represent an actual rule or best practice. Rules in some embodiments are procedural (i.e., code is written to implement the best practice) for increased flexibility and expressive power. The user interface includes the appropriate entry points for the scan engine 208 to invoke the rule. In some embodiments entry points are provided for the following functions:

- to allow the scan engine 208 to pass in context information to the rule; including connection information about the database server instance to scan
- to allow the scan engine 208 to pass in parameters received from the end user of the rule
- to allow the scan engine 208 to pass out parameter values from the rule to the end user (that is, the rule may specify output parameters and upon completion of processing, may return information to the caller. For example, a rule may enable a user to specify how far back to check for backups. Suppose the user asked to check for backups taken during the previous sixty days, but only the previous thirty days could be checked for backups. Upon completion of processing the rule may indicate that it was only able to check for backups taken during the previous thirty days.)
- to invoke execution of the scan by a rule
- to enable the scan engine 208 to notify a rule that the scan request has been aborted
- to enable clean up or housekeeping operations before the executable is unloaded
- to provide a callback to enable the rule to report progress of the scan The rules implementing the interface may be written in any .NET language (e.g., C#, J#, Visual Basic) or in other languages such as but not limited to JAVA and C++.

Figure 3:
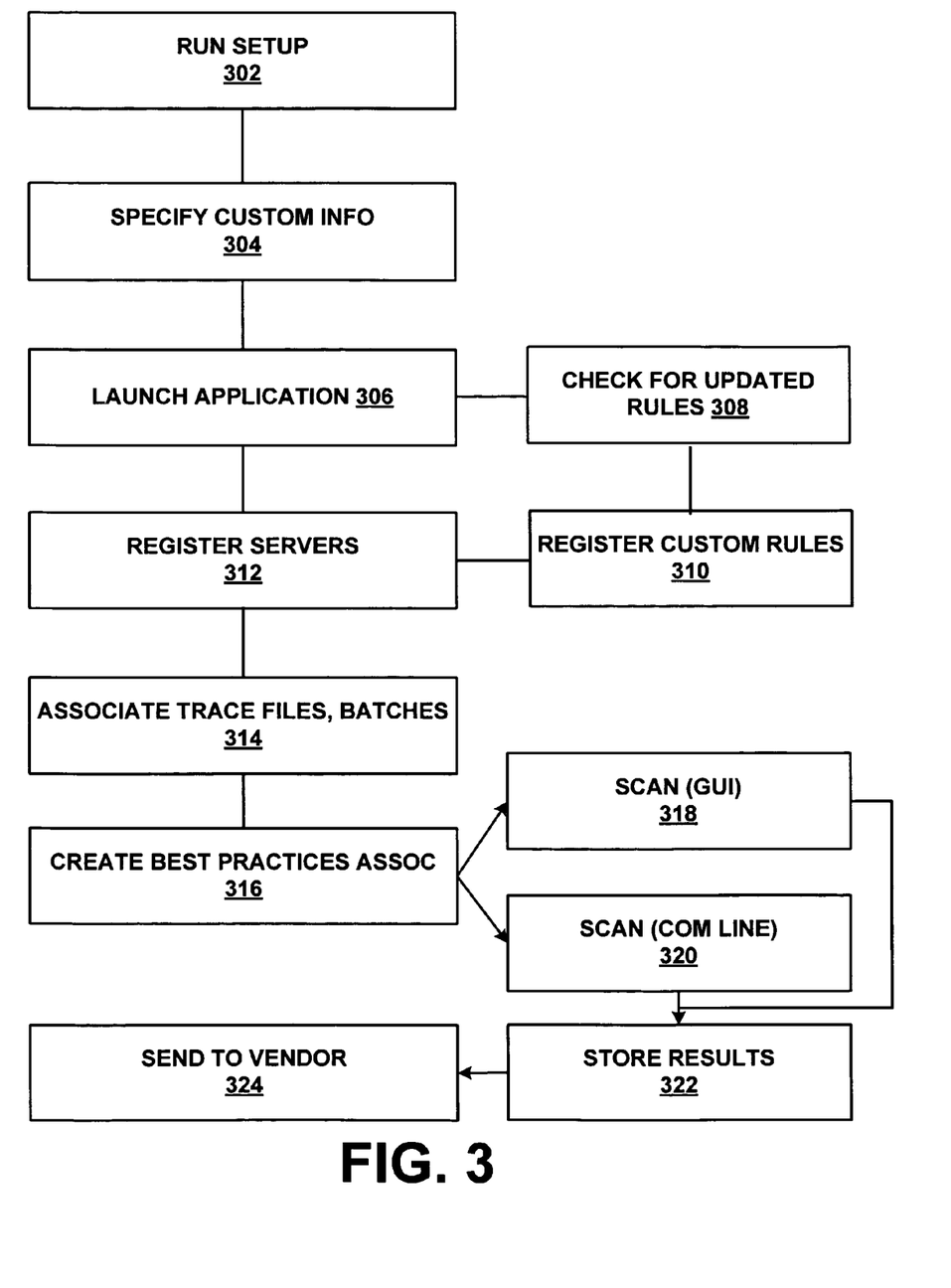
FIG. 3 is a block diagram showing a method for analyzing a database server instance for conformance with best practice guidelines.

FIG. 3 is a flow diagram illustrating an exemplary method for analyzing one or more database server instances for conformance with a set of best practice rules. The first time the application is to be run, the following process may occur. At 302 the setup program is run. In some embodiments the set up program prompts for the name of the repository (repository 210 and/or repository 212) to be created, the type of repository to be created, authentication information, (e.g., user name, and password or the logon user credentials), the installation folder and so on. At 304 the user-specific information is received and stored.

At 306 the Best Practices Analyzer user interface may be launched. Upon launching the user interface, the user may be prompted for the name of the database server instance or instances to be scanned, the name of the database or databases to be scanned and so on. Upon receiving the name of the database servers to be scanned from the user, the database servers are registered (312). Trace files (generated by the database profiler) may be associated with the database servers (314). Query language batches (e.g., TSQL batches stored typically in .sql files) can also be associated with the database servers. At 316 the best practice groups may be created. In some embodiments of the invention, best practices groups include associations of rules, instances of database servers, databases and parameters which together implement a particular policy. After the best practice groups are created, one or more of the rules may be selected, associated with parameters and one or more of the registered servers to set up a particular scan configuration.

The scan configuration may be stored for future use. At this point a scan can be initiated via either the user interface (318) or via the command line tool (320). The results of the scan are stored in the data repository at 322. After the scan is complete, reports can be generated and viewed via the user interface launched at 306. After the initial installation and set up, the application can be launched at 306. At this point results of previous scans can be viewed. Additionally the application may check for new and updated rules at 308 and/or register custom rules at 310. At 324 results of the scan may be reported back to the supplier or vendor or to other entities as specified. Reporting scan results back to a supplier or vendor may be helpful by for example, providing information concerning usage of features, enabling the vendor to better plan future development efforts.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for scanning a database server for conformance with a set of guidelines, the system comprising:
   a computer having a best practices analyzer for performing at least one of an analysis of a database programming language, a check for correct execution of a common administrative task, or a check of a data repository or computer parameter for improper configuration settings or unexpected failures, the best practices analyzer being configured to:
   receive a set of best practice rules including procedural rules for implementation of a best practice for database design features, at least one of the best practice rules being user-defined;
   periodically scan at least one database server instance to provide an upgrade readiness check to enable preparation for upgrade compatibility and determine if the at least one database server instance complies with the set of best practice rules, prior to each scan an online check for new best practice rules and updated best practice rules being conducted and the set of best practice rules being updated automatically whenever a scan is initiated and at least one new or updated best practice rule is detected;
   provide a list of one or more features of the database server to be deprecated in a future release of the database server, an explanation of the need for removal of the one or more features to be deprecated, information on feature replacement, and information regarding migration alternatives;
   generate data from which at least one report detailing conformance or nonconformance of the at least one database server instance with the set of best practice rules are generated, the at least one report indicating an extent of usage of the one or more features of the database server to be deprecated; and
   store said data in a physical memory comprising a data repository, the data repository storing the set of best practice rules, at least one input parameter provided by a user, the at least one input parameter associated with a particular best practice rule, and at least one output parameter resulting from processing the particular best practice rule associated with the at least one input parameter.

2. The system of claim 1, wherein the set of best practice rules comprises at least one best practice rule, the at least one best practice rule associated with at least one parameter and the at least one database server instance.

3. The system of claim 1, wherein the best practice analyzer also comprises a database query language parser, wherein the database query language parser includes identical logic to that of a database server product associated with the at least one database server instance.

4. The system of claim 1, further comprising a user interface for receiving user input and initiating a scan.

5. A method for scanning a database server for conformance with best practice guidelines comprising:
   receiving a plurality of best practice rules including procedural rules for implementation of a best practice for database design features, said best practice rules including at least one user-defined best practice rule for performing at least one of an analysis of a database programming language, a check for the correct execution of a common administrative task, or a check of a data repository or computer parameter for improper configuration settings or unexpected failures;
   receiving a scan configuration comprising at least one database server instance to scan, a set of best practice rules of the plurality of best practice rules for determining whether the at least one database server instance is in conformance with the set of best practice rules, at least one parameter associated with at least one rule of the set of best practice rules, and a list of one or more features of the database server to be deprecated in a future release of the database server, an explanation of the need for removal of the one or more features to be deprecated, information on feature replacement, and information regarding migration alternatives;
   periodically scanning the at least one database server instance to provide an indication of usage of the one or more features of the database server to be deprecated and to provide an upgrade readiness check to enable preparation for upgrade compatibility and determine whether the at least one database server instance conforms to the set of best practice rules based on the at least one parameter, prior to each scan an online check for new best practice rules and updated best practice rules being conducted and the set of best practice rules being updated based automatically whenever a scan is initiated and at least one new or updated best practice rule is detected; and
   storing a result of said scanning in a physical memory comprising a data repository, the data repository storing the set of best practice rules, at least one input parameter provided by a user, the at least one input parameter associated with a particular best practice rule, and at least one output parameter resulting from processing the particular best practice rule associated with the at least one input parameter, said result of said scanning including information regarding an extent of usage of the one or more features of the database server to be deprecated in a future release of the database server.

6. The method of claim 5, wherein the database server instance is an instance of a SQL Server.

7. The method of claim 5, wherein the plurality of best practice rules are executables coded in a procedural programming language.

8. The method of claim 5, further comprising:
   sending said result of said scanning the at least one database server instance to a vendor of a database server product associated with the at least one database server instance.

9. The method of claim 5, wherein scanning the at least one database server instance to determine whether the at least one database server instance conforms to the set of best practice rules based on the at least one parameter is initiated via a command line tool.

10. The method of claim 5, further comprising:
    associating at least one trace file and at least one query language batch file with the scan configuration.

11. A computer-readable storage medium comprising computer-executable instructions for:
    receiving a plurality of best practice rules including procedural rules for implementation of a best practice for database design features, said best practice rules including at least one user-defined best practice rule for performing at least one of an analysis of a database programming language, a check for the correct execution of a common administrative task, or a check of a data repository or computer parameter for improper configuration settings or unexpected failures;

receiving a list of database server instances to be scanned for conformance with the plurality of best practice rules;

receiving a user-specified parameter for a rule of the plurality of best practice rules and a list of one or more features of the database server to be deprecated in a future release of the database server, an explanation of the removal of the one or more features to be deprecated, information on feature replacement, and information regarding migration alternatives;

periodically scanning the list of database server instances to provide an indication of usage of the one or more features of the database server to be deprecated and to provide an upgrade readiness check to enable preparation for upgrade compatibility and check for conformance with the plurality of best practice rules, prior to each scan an online check for new best practice rules and updated best practice rules being conducted and the plurality of best practice rules being updated automatically whenever a scan is initiated and at least one new or updated best practice rule is detected; and storing a result of said scanning in a physical memory comprising a data repository, the data repository storing the plurality of best practice rules, at least one input parameter provided by a user, the at least one input parameter associated with a particular best practice rule, and at least one output parameter resulting from processing the particular best practice rule associated with the at least one input parameter, said result of said scanning including information regarding an extent of usage of the one or more features of the database server to be deprecated in a future release of the database server.

12. The computer-readable storage medium of claim 11, comprising further computer-executable instructions for:

reporting said result of said scanning the list of database server instances for conformance with the plurality of best practice rules back to a supplier of a database server product associated with the list of database sever instances.

13. The computer-readable storage medium of claim 12, comprising further computer-executable instructions for:

parsing query language associated with the database server instance of the list of database server instances for compliance with correct syntax.

14. A system for scanning a database server for conformance with a set of guidelines comprising:

a data repository for storing a set of parameters and a set of best practice rules including procedural rules for implementation of a best practice for database design features, at least one parameter of the set of parameters being an input parameter provided by a user, the at least one input parameter associated with a particular best practice rule of the set of best practice rules and at least one parameter is an output parameter resulting from processing the particular best practice rule associated with the input parameter, and at least one database server instance; and a processor implementing a best practices analyzer for performing at least one of an analysis of a database programming language, a check for the correct execution of a common administrative task, or a check of a data repository or computer parameter for improper configuration settings or unexpected failures, the best practices analyzer being configured to:

receive the set of best practice rules, at least one of the best practice rules being user-defined, periodically scan the at least one database server instance to provide an upgrade readiness check to enable preparation for upgrade compatibility and determine if the at least one database server instance complies with the set of best practice rules, prior to each scan an online check for new best practice rules and updated best practice rules being conducted and the set of best practice rules being updated automatically whenever a scan is initiated and at least one new or updated best practice rule is detected, provide a list of one or more features of the database server to be deprecated in a future release of the database server, information on feature replacement, information regarding migration alternatives, and information regarding replacement of the one or more features to be deprecated, generate data from which at least one report detailing conformance or nonconformance of the at least one database server instance with the set of best practice rules are generated, the at least one report indicating an extent of usage of the one or more features of the database server to be deprecated, and at least one of 1) store said data in a physical memory, 2) display said data and 3) print out said data.

* * * * *